United States Patent [19]

Bonfils

[11] Patent Number: 4,718,282

[45] Date of Patent: Jan. 12, 1988

[54] DEVICE FOR MOUNTING RELATIVE DISPLACEMENT SENSORS ON LUGS ON AN AXLE OR A WHEEL LEVER IN AN AIRCRAFT LANDING GEAR

[75] Inventor: Georges L. A. Bonfils, La Chevraliere, France

[73] Assignee: S.F.E.N.A., S.A., Velizy Villacoublay, France

[21] Appl. No.: 896,827

[22] Filed: Aug. 15, 1986

[30] Foreign Application Priority Data

Aug. 27, 1985 [FR] France ............................ 85 12759

[51] Int. Cl.[4] ............................ G01L 1/00; G01L 1/04
[52] U.S. Cl. .................................... 73/855; 73/862.62
[58] Field of Search ................ 73/855, 856, 779, 780, 73/781, 802, 841, 763, 775, 767, 773, 774, 862.62, 862.64, 862.65, 862.66, 862.68, 862.69, 862.54, 862.04, 65; 177/132, 136

[56] References Cited

U.S. PATENT DOCUMENTS

| 2,722,587 | 11/1955 | Buzzetti et al. | 73/802 |
| 3,390,575 | 6/1967 | Hukle | 73/781 |
| 3,411,348 | 11/1968 | Schultheis, Jr. | 73/775 |
| 3,625,053 | 12/1971 | Laimins | 73/775 |
| 3,780,817 | 12/1973 | Videon | 73/767 |
| 3,797,302 | 6/1972 | Laimins | 73/855 |
| 4,269,070 | 5/1981 | Nelson et al. | 73/779 |
| 4,472,976 | 9/1984 | Bonfils | 73/862.62 |
| 4,553,872 | 11/1985 | Chandra et al. | 73/855 |

Primary Examiner—Stewart J. Levy
Assistant Examiner—Robert R. Raevis
Attorney, Agent, or Firm—McAulay, Fields, Fisher, Goldstein & Nissen

[57] ABSTRACT

The device comprises central anchor means firmly anchored to a lug (3), e.g. the smooth middle portion of a rod (10) capable of being thermally fitted in a smooth round hole (7) through the lug (3) together with first and second independent fixing means (26, 26') disposed on either side of said central anchor means, e.g. two threaded end portions (27, 27') fitted with nuts (28, 28', 29, 29').

20 Claims, 8 Drawing Figures

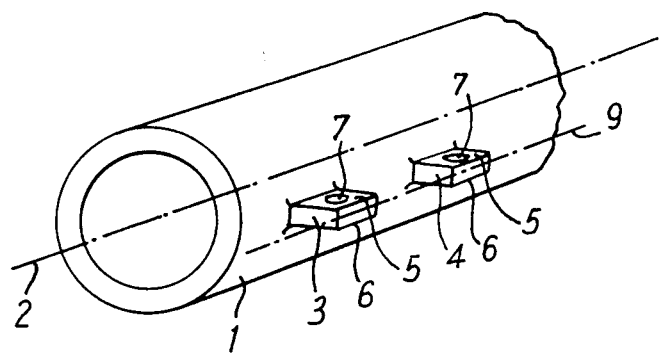
Fig:1
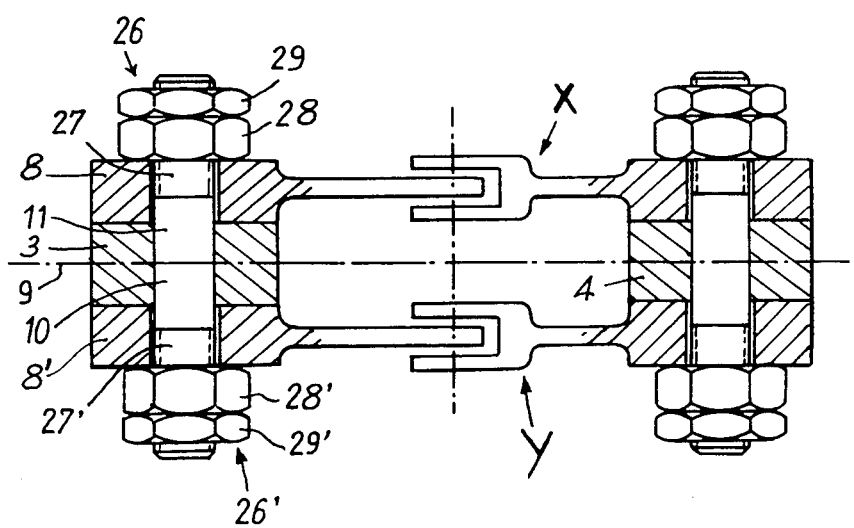
Fig:2

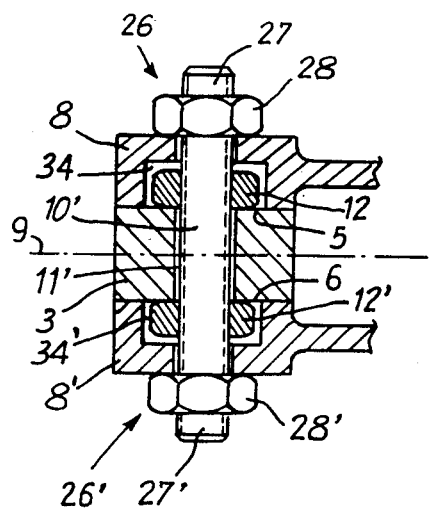
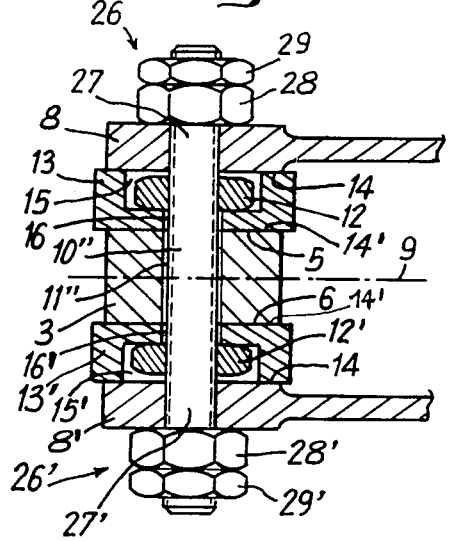
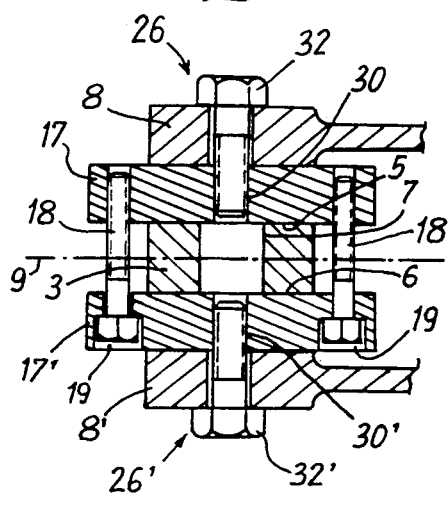
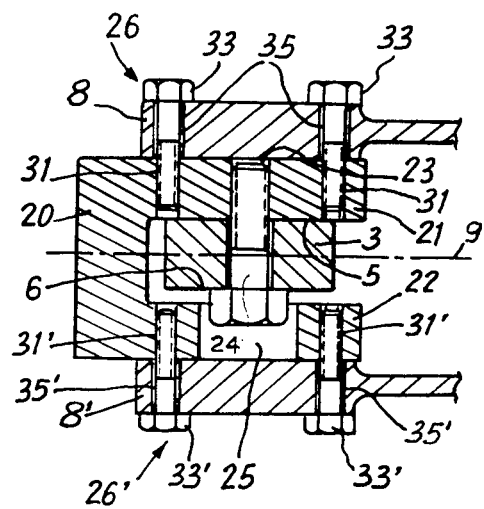

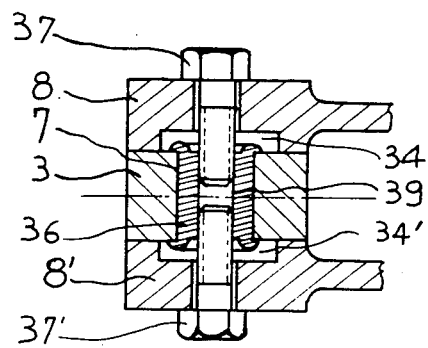
Fig: 7
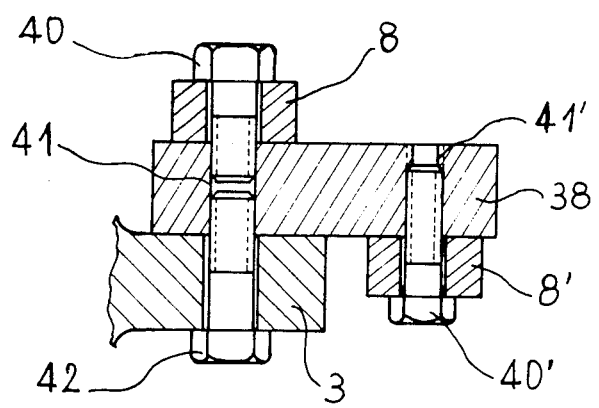
Fig: 8

DEVICE FOR MOUNTING RELATIVE DISPLACEMENT SENSORS ON LUGS ON AN AXLE OR A WHEEL LEVER IN AN AIRCRAFT LANDING GEAR

The invention relates to a device for mounting relative displacement sensors on lugs projecting from an axle or a wheel lever of an aircraft landing gear, said sensors being used to measure to a high degree of accuracy a particular kind of deformation of said aircraft landing gear axle or wheel lever under the effect of a load.

BACKGROUND OF THE INVENTION

Aircraft-mounted systems for measuring the weights and the center of gravity of aircraft are known and are based on the principle of measuring the deformation of the axles and/or the wheel levers of the aircraft landing gear by means of relative displacement sensors, and on using an on-board computer to interpret the results of said measurements.

For example, U.S. Pat. No. 4 269 070 shows a type of relative displacement sensor together with its mounting on a pair of radial lugs, and the sensor itself may be of the inductive, capacitive, optical, piezo-resistive, . . . type. Each lug has at least one plane fixing face, and generally has two opposite plane fixing faces, with a sensor base being firmly fixed to the or each of said fixing faces. Each sensor component mounted on the two lugs of a pair extends towards the other in order to put its measuring components in an accurate position relative to one another. The deformation of the axle or the wheel lever which is to be measured causes the lugs to be displaced relative to each other and consequently it causes a relative displacement of the complementary measuring components.

Heretofore, each lug has had a round smooth hole passing through it between its opposite fixing faces. The sensor bases also have round holes passing therethrough and the sensor is fixed to each lug by means of bolts passing through these holes when in alignment.

Also French Pat. No. 80 16 046 and U.S. Pat. No. 4,472,976 show that in order to obtain accurate measurements, the measuring axis of the sensor must be positioned in the manner defined in said patents.

Over the last ten years, and in spite of there being no international standard on the subject, most of the axles and wheel levers of the landing gear in large aircraft such as those built by Boeing, Douglas, Airbus, etc. have been provided with pairs of lugs as defined above in order to enable relative displacement sensors to be fixed thereto.

The studies summarized below of the entire weighing and centering system explain and justify the need to use devices in accordance with the present invention for fixing two sensors to lugs of the type having two parallel bearing faces and not more than one smooth round hole perpendicular to said faces and substantially in the middle thereof:

firstly, it must be understood that in a weighing and centering system, the useful signal from each sensor as taken into account by the computer is the difference between the output signal from the sensor at a given moment and the signal which the sensor provides when the landing gear is not standing on the ground (which signal is referred to as sensor zero);

studies on the elastic deformation of the various axles and wheel levers of the aircraft concerned shows that the usable displacement of the sensor (corresponding to the useful signal applied to the computer) lies in the range 0.01 mm to 0.03 mm;

the maximum error which users are prepared to tolerate on weighing and centering is about 1%;

given the surface state of the lug bearing faces, which faces are protected by anticorrosion paint if a sensor fixed thereagainst is removed and then replaced, the new measurement obtained may differ from the preceding measurement by 0.005 mm to 0.02 mm, and this difference may be considerably increased if a sensor is replaced by a different sensor;

if a single sensor is fixed to each pair of lugs, the system ceases to work in the event of the sensor breaking down, and given the above remark concerning the effects of changing a sensor, the entire system needs re-setting if ever a sensor is replaced; and if two sensors are fixed to each pair of lugs and if two computers are used, a back-up or redundant system is obtained in which the problem of a breakdown in one sensor appears to be solved since the other sensor mounted on the same pair of lugs can replace it.

However, when the faulty sensor is replaced, there arises a problem which the present invention seeks to solve. When a faulty sensor is replaced, the effect of releasing the other sensor from a lug is equivalent to the effect of replacing that other sensor, and from the above explanations it can be seen that the zero point of both sensors will need to be reset after the system has been reassembled.

Resetting the zero point would not be difficult if the aircraft could easily be weighed on scales or a weighbridge. However, this is not easily done for aircraft, and in particular for large aircraft.

With large aircraft the remaining solutions are: to trust the manifest which may be in error; to fly the aircraft empty; or else to jack the aircraft up so that no weight is applied to its landing gear with both of the "no-weight" solutions being long and expensive.

A cheap and effective solution consists in using a device in accordance with the present invention.

In order to improve the reliability of the measuring means, it is desirable to mount two sensors on each lug which are independent from each other so that when one of the sensors fixed to a lug needs to be removed or replaced, the other sensor fixed to the same lug is not disturbed.

The main aim of the invention is to provide a mounting device for mounting two sensors on a single lug which may have not more than one smooth round hole passing therethrough and which constitutes a part of an axle or a wheel lever in an aircraft, where it is desired to measure a particular deformation of the axle or wheel lever, said mounting device enabling two sensors to be fixed to said lug in a manner which allows each sensor to be totally independent of the other.

SUMMARY OF THE INVENTION

A device in accordance with the invention for independently mounting two sensors on a lug having two opposite planar fixing faces comprising, for each lug:

central anchor means firmly anchored to the lug and serving as an anchoring base;

first fixing means for fixing one of the fixing bases of a first sensor to the lug, said anchor means serving as an anchoring base therefor; and second fixing means for fixing one of the fixing bases of a second sensor to the lug, with said first and second fixing means being independent from each other.

BRIEF DESCRIPTION OF THE DRAWINGS

Embodiments of the invention are described by way of example with reference to the accompanying drawings, in which:

FIG. 1 is a fragmentary diagrammatic perspective view of the portion of an axle or a wheel lever in an aircraft landing gear which is provided with two "conventional" lugs for mounting a relative displacement sensor which is used in computing the weight and center of gravity of the aircraft;

FIG. 2 is a section on a plane passing through the axes of the smooth round holes existing in the conventional lugs and showing a first embodiment of a mounting device in accordance with the invention;

FIGS. 3 to 7 are section views of the same plane as FIG. 2 and show five variant embodiments of the invention; and FIG. 8 is a section view on a longitudinal plane of a lug, perpendicular to the beam from which said lug projects.

MORE DETAILED DESCRIPTION

FIG. 1 shows a portion of an axle or of a wheel lever 1 which is referred to below as a "beam", said beam having a longitudinal axis 2 and two conventional radially directed lugs 3 and 4 situated on the same side of the axis and spaced apart in the axial direction. These lugs are integral parts of the beam.

Each lug has a rectangular right cross section with two planar faces 5 and 6 which are mutually parallel and parallel to the axis 2.

It has been usual heretofore for a smooth round hole to pass through the middle of each lug perpendicularly to its faces 5 and 6. A device in accordance with the invention may make use of the hole 7, but may also do without such a hole, as may be seen in FIG. 5, for example. The invention thus relates to conventional lugs, even if holes 7 are omitted therefrom.

FIG. 2 shows a device in accordance with the invention for fixing first and second sensors X and Y to the faces 5 and 6 respectively of each of the two lugs 3 and 4. These sensors are conventional; there is no need to describe them in detail. Each sensor has a base 8, 8' by which it is fixed either directly or indirectly to a respective one of the faces 5 and 6 of each lug 3 and 4.

A central anchor means is constituted, in FIG. 2, by a rod 10 having a smooth cylindrical mid portion 11 which is at least as long as the thickness of a lug between its opposite faces 5 and 6. The diameter of this mid portion 11 is selected so that the rod 10 can be firmly fitted in the hole 7, for example by cooling the rod 10 to a very low temperature, thereby contracting it sufficiently to allow it to be inserted through the hole 7. After returning to the same temperature as the lug, said rod is firmly anchored to the lug. Each end portion 27 and 27' of the rod is threaded and is situated outside the hole 7 through the lug after the anchor device has been set in place therein.

Other means for fixing the central anchor means A inside the hole 7 of a lug include electron beam welding or laser welding or gluing.

In the embodiment shown in FIG. 2, there are independent fixing means 26, 26' comprising, respectively, at least one nut 28 or 28', preferably accompanied by a corresponding lock-nut 29 or 29', which nuts are screwed on the threaded end portions 27 and 27' of the rod 10. Each fixing means is suitable for fixing one of the two bases 8, 8' of each sensor either directly or else indirectly to a respective one of the faces 5 and 6 of the lug. Each sensor may thus be installed or removed independently from the other.

FIG. 3 shows a device in accordance with the invention where the anchor means A comprises a rod 10' having a mid portion 11' of smaller diameter than the hole 7 and capable of passing freely therethrough and threaded to receive two opposite nuts 12 and 12' which clamp directly against portions of respective ones of the faces 5 and 6 of the lug 3.

The first and second independent fixing means are constituted by nuts 28 and 28' (and lock nuts, not shown, should advantageously be used as well). The nuts 28 and 28' are screwed onto the rod 10' to enable two fixing bases 8 and 8', one from each relative displacement sensor, to be fixed to a corresponding one of the faces 5 and 6 of the lug 3.

FIG. 4 shows another device in accordance with the invention in which the anchor means comprises a rod 10" having a mid portion 11" of smaller diameter than the diameter of the hole 7 in order to pass freely therethrough, and threaded so as to enable two opposite nuts 12 and 12' to be screwed thereon and to press against and clamp two intermediate sole plates 13 and 13' which are disposed between corresponding ones of the nuts 12 and 12' and the faces 5 and 6 of the lug 3. Each sole plate 13 or 13' is of rectangular right cross-section with two opposite plane faces 14 or 14' which are mutually parallel and one of which is pressed either directly or indirectly against one of the faces 5 or 6 of the lug, while the other of which is intended to receive one of the bases 8 and 8' of the sensors. Preferably, each intermediate plate 13 and 13' has a blind hole 15 or 15' which is open to the face 14 directed away from the lug and having a smooth hole 16 and 16' opening out therein to provide free passage for the rod 10". The recesses 15 and 15' are used to contain the nuts 12 and 12', respectively. The first and second independent fixing means are respectively constituted by nuts 28 and 28', together with associated lock nuts 29 and 29'. These nuts and lock nuts are screwed onto the rod 10" and serve to fix a corresponding fixing base 8 or 8' to a respective one of the lug faces 5 and 6.

FIG. 5 shows another device in accordance with the invention in which the anchor means comprises two straps 17 and 17' each of which is longer than the width of the lug and each of which extends in a direction parallel to the longitudinal axis 2 of the beam. The straps are intended to be applied either directly or indirectly against the opposite faces 5 and 6 of a lug and to be firmly clamped thereagainst, e.g. by means of screws 18. The screws may be replaced by bolts or by rivets. Recesses 19 are provided in the straps 17 and 17' in order to hide the heads or the nuts of the screws or bolts. After being mounted on a lug, the straps 17 and 17' have an outside plane face for fixing to one or other of the sensor bases 8 and 8'. After the screws 18 have been tightened, the device is firmly anchored to the lug. In this variant, the hole 7 through the lug is not used and it could be omitted.

The first and second independent fixing means are respectively constituted by screws 32 and 32' which are received in respective tapped holes 30 and 30' in each of the straps 17 and 17' and serve to fix respective fixing bases 8 and 8' of the sensors to the straps 17 and 17', and thus to the lug 3.

FIG. 6 shows another device in accordance with the invention, and comprising a channel-section part 20 having two parallel flanges 21 and 22 which are held apart at a distance which is greater than the thickness of the lug between its opposite faces 5 and 6. The anchor means comprises the channel-section part 20 which is fitted with a tapped hole 23 in one flange 21 for receiving a screw 24 which passes freely through the smooth hole 7 of the lug. Preferably, and in order to avoid excessively increasing the distance between the two flanges 21 and 22, an opening 25 is provided is the opposite lug 22 in order to receive the screw head 24. After mounting, the inside face of the flange 21 having the tapped hole 23 is pressed either directly or indirectly against the face 5 of the lug, and the head of the screw 24 is pressed against the opposite face. After the screw 24 has been tightened, the channel section part 20 is firmly anchored to the lug.

The first and second independent fixing means are respectively constituted by pairs of screws and 33 and 33' which are received in tapped holes 31 and 31' in each of the flanges 21 and 22 of the parts 20, thereby enabling each sensor base 8 and 8' to be fixed to a corresponding outside face of the flanges 21 and 22, thereby fixing said bases to the part 20 and thus to the lug 3.

FIG. 7 shows another device in accordance with the invention in which the anchor means is constituted by a sleeve 36 having an axial tapped bore 39, said sleeve being fitted in the hole 7 of the lug 3 and crimped to each of the faces 5 and 6 of the lug 3.

The sleeve is thus anchored to the lug 3.

The first and second independent fixing means are respectively constituted by clamping screws 37 and 37' which screw into the tapped bore 39 of the sleeve 36 and which also pass through a corresponding one of the sensor bases 8 and 8'.

The screws 37 and 37' are of lengths such that once tightened in place their ends do not come into contact.

Each of the first and second independent fixing means is capable of mounting and fixing a corresponding sensor base 8 or 8' either directly or indirectly against a face 5 or 6 of the lug. Each sensor may thus be installed or removed independently from the other.

If necessary, the bases 8 or 8' are fitted to the device in accordance with the invention. For example, in FIGS. 3 and 7 each base 8 or 8' has a blind recess 34 or 34' in addition to the hole provided for a conventional fixing. These blind recesses are intended to contain a nut 12 or 12' or else the crimped-over end portions of the sleeve 36.

In FIG. 6, each base 8 and 8' has two mounting holes 35 and 35'.

FIG. 8 shows another device in accordance with the invention, in which the anchoring means comprises a strap 38 which is longer than the longitudinal dimension of each lug parallel to the lug faces 5 and 6. This strap is intended to be pressed either directly or indirectly against one of the opposite faces 5 or 6 of a lug and to be firmly clamped thereagainst, for example by means of a screw 42 passing through the hole 7 in the lug and screwed into a tapped hole 41 in the strap 38, thereby firmly anchoring the strap 38 to the lug 3.

The independent fixing means B comprises a screw 40 which is screwed, for example, into the tapped hole 41 and serves to fix a sensor base 8 to one of the faces of the strap 38. The other independent fixing means C comprises a screw 40' screwed into a tapped hole 41' in the strap 38 and serves to fix a sensor base 8' to the opposite face of the strap 38 from the face on which the other sensor base if fixed. However, the bases 8 and 8' of each sensor could alternatively be fixed to the same face of the strap 38.

The invention also covers all other variants which do not go beyond the scope of the claims.

I claim:

1. A device for independently mounting a first and a second relative displacement sensor on a pair of lugs constituting an integral portion of an axle or a wheel lever of an aircraft landing gear, said lugs each having a hole and a pair of mutually parallel opposite planar bearing faces, each said sensor having a fixing base, the device comprising for each lug:

anchor means firmly anchored to the lug and serving as an anchoring base;

first fixing means for fixing the fixing base of said first sensor to the lug, said anchor means serving as an anchoring base therefor; and second fixing means for fixing the fixing base of said second sensor to the lug, said anchoring means serving as an anchoring base therefor, with said first and said second fixing means being mounted independently from each other with respect to a respective bearing face of said opposite planar bearing faces.

2. A device according to claim 1, wherein said hole in each said lug is a smooth round hole passing therethrough, the anchor means being constituted by a rod which is threaded at its ends, and which has a smooth mid portion of a length substantially equal to the thickness of the lug between its opposite faces and having a diameter which is selected to enable the rod to be firmly fitted in the smooth round hole of the lug.

3. A device according to claim 2, wherein said first and second fixing means comprise respective clamping nuts screwed on said respective threaded ends of the rod which passes through the smooth round hole through the lug.

4. A device according to claim 1, wherein said hole in each said lug is a smooth round hole passing between the two faces, said anchor means comprising a rod of smaller diameter than said smooth round hole, said rod being threaded, at least at each end, in order to enable it to be fixed to the lug by means of two nuts.

5. A device according to claim 4, wherein said first and second fixing means comprise respective clamping nuts screwed on the respective threaded end portions of the rod which passes through the smooth round hole through the lug.

6. A device according to claim 4, wherein said anchor means further includes two intermediate sole plates which are interposed between the nuts and said faces of each said lug, said sole plate including a respective blind recess for receiving the corresponding nut.

7. A device according to claim 6, wherein said first and second fixing means comprise respective clamping nuts screwed on the respective threaded end portions of the rod which passes through the smooth round hole through the lug.

8. A device according to claim 1, wherein said hole in each said lug is a smooth round hole passing therethrough between its opposite faces, and said anchor means being constituted by a sleeve having a diametrical extent small enough to fit in the smooth round hole and whose ends are crimped to said faces of the lug, said sleeve having a tapped bore.

9. A device according to claim 8, wherein the first and second fixing means are constituted by respective clamping screws which screw into the tapped bore of the sleeve and which pass through respective sensor bases.

10. A device according to claim 1, wherein the lug extends in a direction transverse to the axes of the axle or wheel lever, and the anchor means comprises two straps which are longer than the width of the lug in its transverse direction, together with at least two screws or bolts for clamping the two straps against respective opposite faces of the lug.

11. A device according to claim 10, wherein the first and second fixing means are constituted by respective ones of said straps each having at least one tapped hole for receiving at least one screw, said screws passing through respective sensor bases.

12. A device according to claim 1, wherein said hole in each said lug is a smooth round hole passing therethrough between two opposite faces, said anchor means comprising a channel-section part having two parallel flanges which are separated by a distance which is greater than the thickness of the lug, together with a screw of smaller diameter than the smooth round hole through the lug, one of the flanges having a tapped hole into which said screw is screwed, and the other flange of said part having an opening for receiving the head of said screw.

13. A device according to claim 12, wherein the first and second fixing means are constituted by respective flanges of the channel-section part, with each of said flanges having at least two tapped holes for receiving respective screws, said screws passing through corresponding sensor bases.

14. A device according to claim 1, wherein said hole in each said lug is a smooth round hole passing therethrough between its opposite faces, said anchor means comprising a strap having parallel faces and a screw passing through the smooth round hole and screwed into a tapped hole in said strap in order to clamp said strap against one of said faces of the lug.

15. A device according to claim 14, wherein the first and second fixing means are constituted by respective screws screwing into respective tapped holes in the strap.

16. A device for independently mounting first and second relative displacement sensors on a pair of lugs constituting an integral portion of an axle or a wheel lever of an aircraft landing gear, each said sensor having a fixing base, and said lugs each having a pair of mutually parallel opposite planar bearing faces, the device comprising for each said lug:
anchor means for each said lug firmly anchored thereto and serving as an anchoring base;
first fixing means for fixing the fixing base of said first sensor to the lug, said anchor means serving as an anchoring base therefor; and
second fixing means for fixing the fixing base of said second sensor to the lug, said anchoring means serving as an anchoring base therefor, with said first and said second fixing means being mounted independently from each other with respect to a respective bearing face of said opposite planar bearing faces.

17. A device according to claim 16, wherein at least one of said lugs has a smooth round hole passing therethrough, and at least one of said anchor means being constituted by a rod which is threaded at its ends, and which has a smooth mid portion of lengths substantially equal to the thickness of the lug between its opposite faces and having a diameter which is selected to enable the rod to be firmly fitted in the smooth round hole of said at least one of said lugs.

18. A device according to claim 16, wherein at least one of said lugs has a smooth round hole passing between said two planar faces, said anchor means comprising a rod of smaller diameter than the diameter of said smooth round hole, said rod being threaded, at least at each end, in order to enable it to be fixed to said at least one lug having said hole by means of two nuts.

19. A device according to claim 18, wherein said anchor means includes two intermediate sole plates which are interposed between nuts and the faces of said lug, said sole plate including a respective blind recess for receiving a corresponding nut.

20. A device according to claim 16, wherein the lug extends in a direction transverse to the axes of the axle or wheel lever, and said anchor means comprises two straps which are longer than the width of said lug in its transerve direction, together with at least two screws or bolts for clamping the two straps against respective opposite faces of the lug.

* * * * *